(No Model.)

E. BENDER.
FRYING UTENSIL.

No. 298,339. Patented May 13, 1884.

WITNESSES:
A. P. Grant,
W. F. Kircher

INVENTOR:
Edwin Bender,
BY John A. Diederoshein
ATTORNEY.

UNITED STATES PATENT OFFICE.

EDWIN BENDER, OF PHILADELPHIA, PENNSYLVANIA.

FRYING-UTENSIL.

SPECIFICATION forming part of Letters Patent No. 298,339, dated May 13, 1884.

Application filed April 28, 1883. (No model.)

*To all whom it may concern:*

Be it known that I, EDWIN BENDER, a citizen of the United States, residing in the city and county of Philadelphia, State of Pennsylvania, have invented a new and useful Improvement in Frying - Utensils, which improvement is fully set forth in the following specification and accompanying drawings, in which—

Figure 1:
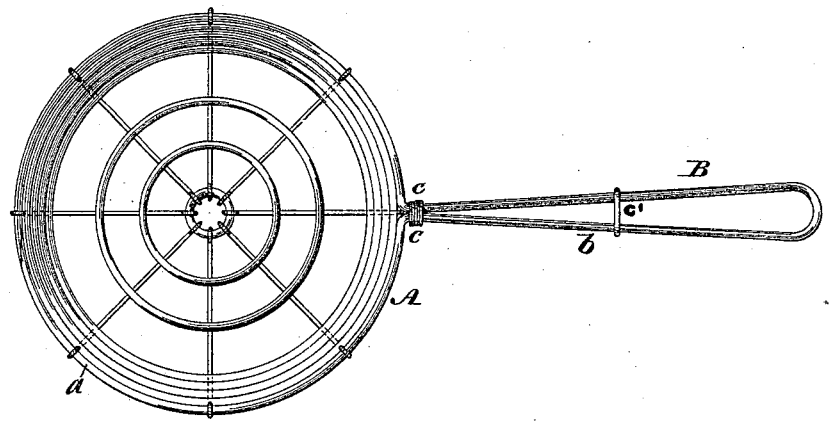
Figure 2:
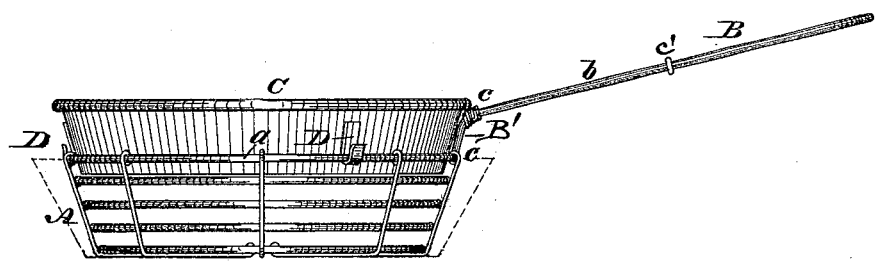

Figure 1 is a top or plan view of the frying utensil embodying my invention. Fig. 2 is a side elevation thereof.

Similar letters of reference indicate corresponding parts in the two figures.

My invention consists of a pan formed of wire, so as to be of open nature, adapted to be set within an ordinary frying-pan, the construction and advantages whereof will be hereinafter fully set forth.

It also consists of a guard at the top of the wire pan.

Referring to the drawings, A represents the body of the pan, and B the handle thereof. The body is formed of wire, of a series of concentric rings of increasing diameter, arranged to constitute the bottom and sides of the body, the same being united by cross-wires running from the top down the sides and under the bottom to the center, thus leaving the body of open-work, which may, however, be produced by weaving the wire, forming meshes throughout the body.

The handle B is constructed of a piece of wire bent to form a hoop, $a$, to accord with the top of the body to which it is secured, and then doubled or bent and braced, as at $c\,c$, forming the grasping part or handle proper, $b$, the parts $a\,b$ being one continuous piece, the ends of which are united by soldering or other suitable means, the whole forming a light, strong, and durable handle for and connection with the body of the pan.

The article to be fried is placed in the body A, and the latter set in an ordinary frying-pan, which is suitably supplied with fat, said pan being shown by dotted lines, Fig. 2, it being noticed that the handle B extends vertically, as at B', in two lengths, from the hoop portion $a$ to the bend where the bracing $c$ is applied, thus elevating the handle above said hoop portion to permit the body A to be inserted or set into the aforesaid pan and turned around therein, as required. The elevation of the handle also permits the application of a guard to the top of the body, said guard resting on the handle at $c$, and being hereinafter more fully described. As the body is of open-work, the boiling fat readily reaches the articles therein, and the divisions formed by the wires separate the fat, causing it to rise in numerous jets, the action of which on the articles rapidly and thoroughly fries the same. The wire pan is now lifted from the frying-pan and held thereover for a short time, so as to cause the articles to drain, the surplus fat dropping into the frying-pan, after which the wire pan may be overturned and discharged of its contents without fat dripping therefrom.

The wire pan may be replenished and returned to the frying-pan, the subsequent operations being similar to those stated, it also being noticed that the discharge of the contents of the wire pan is accomplished in a most convenient and desirable manner, as the hand of the cook is removed from the discomfort and burning nature of the hot fat.

C represents an upright rim of sheet metal, provided with hooks, clasps, or other fastenings, D, and fitting the top of the body A, with which it is connected by the fastenings D, the latter engaging with the upper wire thereof. By this provision the tendency of the fat to splash or spurt from the pan is restrained, as the same strikes the solid wall formed by the rim and so returns into the frying-pan, whereby I avoid burning of the fat on the stove, range, &c., and the consequent smell thereof, and likewise the liability of burning the hands, face, and garments of the cook. The guard may be removed, when required, by bending the hooks D, so as to clear the top hoop, and afterward reapplied in a most convenient manner.

It is evident that two pans may be employed, so that while one pan is in the fat the other is replenished and may immediately take the place of the one removed, thus doubling the capacity of work.

I am aware that it is not new to make a wire body, the same having its top ring extended to make the handle, and I do not therefore claim the same, broadly.

Having thus described my invention, what I claim as new, and desire to secure by Letters Patent, is—

1. A frying-utensil consisting of dishing body formed of wire, a rigidly-connected handle continuous of the top ring of said body, and a removably-connected guard-rim at the upper end of the body, substantially as and for the purpose set forth.

2. The frying-pan body formed of wire-work, in combination with a rim, C, set in said body and removably connected therewith by the hooks D, which engage with the top thereof, substantially as and for the purpose set forth.

EDWIN BENDER.

Witnesses:
JOHN A. WIEDERSHEIM,
A. P. GRANT.